United States Patent
Numajiri

(10) Patent No.: US 9,822,767 B2
(45) Date of Patent: Nov. 21, 2017

(54) FLOATING-BODY TYPE WIND TURBINE POWER GENERATING APPARATUS AND METHOD OF TRANSPORTING COMPONENTS OF THE SAME

(71) Applicant: MHI VESTAS OFFSHORE WIND A/S, Aarhus N (DK)

(72) Inventor: Tomohiro Numajiri, Tokyo (JP)

(73) Assignee: MHI VESTAS OFFSHORE WIND A/S, Aarhus N (DK)

(*) Notice: Subject to any disclaimer, the term of this patent is extended or adjusted under 35 U.S.C. 154(b) by 0 days.

(21) Appl. No.: 14/646,584

(22) PCT Filed: Nov. 30, 2012

(86) PCT No.: PCT/JP2012/081089
§ 371 (c)(1),
(2) Date: May 21, 2015

(87) PCT Pub. No.: WO2014/083684
PCT Pub. Date: Jun. 5, 2014

(65) Prior Publication Data
US 2015/0275850 A1  Oct. 1, 2015

(51) Int. Cl.
*F03D 13/25* (2016.01)
*F03D 80/00* (2016.01)
(Continued)

(52) U.S. Cl.
CPC .............. *F03D 13/25* (2016.05); *B63B 35/44* (2013.01); *B63B 39/06* (2013.01); *E02D 27/425* (2013.01);
(Continued)

(58) Field of Classification Search
CPC . F03D 1/001; F03D 1/005; F03D 9/30; F03D 13/20; F03D 13/22; F03D 13/25;
(Continued)

(56) References Cited

U.S. PATENT DOCUMENTS 7,895,847 B2 * 3/2011 Larsen ...................... F03D 7/02
62/236
8,033,791 B1 * 10/2011 Watanabe ............... F03D 80/00
416/146 R (Continued)

FOREIGN PATENT DOCUMENTS

CN 2262124 Y 9/1997
CN 201110245 Y 9/2008
(Continued)

OTHER PUBLICATIONS

Det Norske Veritas, Corrosion Protection of Floating Production and Storage Units, Apr. 2007, Recommened Practice DNV-RP-B101.*

(Continued)

*Primary Examiner* — Ninh H Nguyen
*Assistant Examiner* — Brian P Wolcott
(74) *Attorney, Agent, or Firm* — Manabu Kanesaka; Benjamin Hauptman; Kenneth Berner

(57) ABSTRACT

A floating-body type wind turbine power generating apparatus includes a floating body floating on a water surface; and a wind turbine disposed on the floating body and configured so that at least a part of the wind turbine is submersible. The wind turbine includes: at least one blade; a hub to which the blade is mounted; a tower erected on the floating body; a nacelle disposed on the tower; a first electrical device disposed inside the hub or the nacelle; and a second electrical device connected to the first electrical device via a cable and configured to be movable relative to the tower in a vertical direction so as not be submerged upon submergence of the wind turbine.

7 Claims, 16 Drawing Sheets

(51) Int. Cl.
*F03D 80/50* (2016.01)
*F03D 80/80* (2016.01)
*B63B 35/44* (2006.01)
*B63B 39/06* (2006.01)
*E02D 27/42* (2006.01)
*B63B 21/50* (2006.01)
*B63B 1/04* (2006.01)

(52) U.S. Cl.
CPC ............ *F03D 80/00* (2016.05); *F03D 80/50* (2016.05); *F03D 80/82* (2016.05); *F03D 80/88* (2016.05); *B63B 21/50* (2013.01); *B63B 2001/044* (2013.01); *B63B 2021/505* (2013.01); *B63B 2035/446* (2013.01); *F05B 2230/60* (2013.01); *F05B 2230/6102* (2013.01); *F05B 2230/70* (2013.01); *F05B 2240/912* (2013.01); *F05B 2240/93* (2013.01); *F05B 2240/95* (2013.01); *F05B 2240/97* (2013.01); *Y02E 10/725* (2013.01); *Y02E 10/726* (2013.01); *Y02E 10/727* (2013.01); *Y02E 10/728* (2013.01); *Y02P 70/523* (2015.11)

(58) Field of Classification Search
CPC .......... F03D 13/40; F03D 80/55; F03D 80/80; F03D 80/82; F03D 80/85; F03D 80/88; F03D 80/50; F05B 2230/60; F05B 2230/6102; F05B 2230/70; F05B 2240/93; Y02E 10/727; B63B 35/44
See application file for complete search history.

(56) References Cited

U.S. PATENT DOCUMENTS

| 2004/0169376 | A1* | 9/2004 | Ruer | E02D 27/42 290/55 |
| 2011/0037264 | A1 | 2/2011 | Roddier et al. | |
| 2011/0119889 | A1* | 5/2011 | Numajiri | B63B 27/10 29/428 |
| 2011/0142680 | A1 | 6/2011 | Numajiri | |
| 2011/0241347 | A1* | 10/2011 | Boureau | F03D 13/10 290/53 |
| 2014/0377060 | A1 | 12/2014 | Quell | |

FOREIGN PATENT DOCUMENTS

| CN | 102015435 A | 4/2011 | |
| CN | 102325992 A | 1/2012 | |
| DE | 102010046394 A1 | 3/2012 | |
| EP | 1234978 A2 | 8/2002 | |
| JP | 2004-175137 A | 6/2004 | |
| JP | 2006-274816 A | 10/2006 | |
| JP | 2007-263077 A | 10/2007 | |
| JP | 2007263077 A * | 10/2007 | |
| JP | 2009-213487 A | 9/2009 | |
| JP | 2010-223113 A | 10/2010 | |
| JP | 2010-223114 A | 10/2010 | |
| JP | 2011-521820 A | 7/2011 | |
| JP | 2012-045981 A | 3/2012 | |
| JP | 2012-107584 A | 6/2012 | |
| WO | WO 2010023743 A1 * | 3/2010 | ............ B63B 27/10 |
| WO | WO 2010093259 A2 * | 8/2010 | ............ F03D 13/25 |
| WO | WO 2010110329 A1 * | 9/2010 | ........ B63B 35/4406 |
| WO | 2011/138824 A1 | 11/2011 | |
| WO | WO 2012169914 A1 * | 12/2012 | ............ B63B 21/50 |
| WO | 2013/084632 A1 | 6/2013 | |
| WO | 2013/084856 A1 | 6/2013 | |

OTHER PUBLICATIONS

Japan Patent Office, "Decision to grant a patent for Japanese Patent Application No. 2014-549731," Dec. 4, 2015.
PCT/ISA/210, "International Search Report for PCT/JP2012/081089," dated Mar. 12, 2013.
PCT/IB/338, "International Preliminary Report on Patentability for PCT/JP2012/081089," dated Jun. 11, 2015.
Europe Patent Office, "Search Report for European Patent Application No. 12889096.9," dated Aug. 8, 2016.
China Patent Office, "Office Action for Chinese Patent Application No. 201280077410.5," dated Apr. 25, 2017.

* cited by examiner

FLOATING-BODY TYPE WIND TURBINE POWER GENERATING APPARATUS AND METHOD OF TRANSPORTING COMPONENTS OF THE SAME

RELATED APPLICATIONS

The present application is National Phase of International Application No. PCT/JP2012/081089 filed Nov. 30, 2012, the disclosure of which is hereby incorporated by reference herein in its entirety.

TECHNICAL FIELD

The present disclosure relates to a floating-body type wind turbine power generating apparatus including a floating body floating on water surface and a wind turbine disposed on the floating body, and to a method of transporting components of the same.

BACKGROUND

Wind turbine power generating apparatuses have become increasingly popular in recent years in view of preservation of the global environment. Especially, large wind turbine power generating apparatuses, which are advantageous in improving power generation efficiency, have been planned to be launched on water such as ocean or lakes in various regions.

As a wind turbine power generating apparatus installed on the water, a floating-body type wind turbine power generating apparatus with a wind turbine built on a floating body which floats on the water surface is known. There is a large floating-body type wind turbine power generating apparatus with a tower having a height of several tens of meters to more than a hundred meters. In such a floating-body type wind turbine power generating apparatus, it is extremely difficult to access a high altitude such as the top of the tower, a nacelle or a hub of the wind turbine while the wind turbine power generating apparatus is on the water upon maintenance, installation, deconstruction, or the like.

In this regard, Patent Document 1 discloses a method of submerging a tower of a wind turbine to make the tower contact the sea bottom upon maintenance, in order to facilitate access to an upper section of the wind turbine. Further, Patent Documents 2 and 3 disclose configurations in which a tower of a wind turbine is submerged in a spar upon maintenance.

CITATION LIST

Patent Literature

Patent Document 1: JP2012-45981A
Patent Document 2: JP2010-223113A
Patent Document 3: JP2010-223114A

SUMMARY

Meanwhile, a floating-body type wind turbine power generating apparatus includes a large number of various electrical devices such as a generator, a control panel, and a transformer. While some of these devices are disposed at an upper section of the wind turbine, some are disposed at a lower section. For instance, electrical devices such as a control panel and an operation panel are disposed in each of an upper space such as inside of the nacelle, inside of the hub or the upper part inside the tower and a lower space such as inside of the tower and the lower section outside the tower to be used for necessary operation at each location. In a normal floating-body type wind turbine power generating apparatus, the wind turbine is out of the water except for the floating body, and thus the electrical devices are not supposed to be submerged in water. However, in a case where the wind turbine is to be submerged under water upon maintenance or the like, the electrical devices, especially those disposed at the lower section, may be submerged in water.

In this regard, Patent Documents 1 to 3 only disclose configurations for submerging a floating-body type wind turbine power generating apparatus upon maintenance, and the possible submergence of the electrical devices is not considered at all. Although the risk of submergence may be reduced if a tower is submerged in a spar as disclosed in Patent Documents 2 and 3, great power is required to submerge a large tower into a spar.

An object of at least one embodiment of the present invention is to provide a floating-body type wind turbine power generating apparatus whereby it is possible to protect electrical devices from submergence even in a case where the wind turbine power generating apparatus is submerged, and a method of transporting components of the same.

Solution to Problems

A floating-body type wind turbine power generating apparatus according to at least one embodiment of the present invention includes: a floating body floating on a water surface; and a wind turbine disposed on the floating body and configured so that at least a part of the wind turbine is submersible. The wind turbine includes: at least one blade; a hub to which the blade is mounted; a tower erected on the floating body; a nacelle disposed on the tower; a first electrical device disposed inside the hub or the nacelle; and a second electrical device connected to the first electrical device via a cable and configured to be movable relative to the tower in a vertical direction so as not be submerged upon submergence of the wind turbine.

With the above floating-body type wind turbine power generating apparatus, upon submergence of the wind turbine, the second electrical device connected to the first electrical device disposed at a high altitude via the cable is movable relative to the tower in the vertical direction. Thus, it is possible to securely prevent the second electrical device from being submerged. In the case of a floating-body type wind turbine power generating apparatus, it is particularly difficult to maintain a sealed space for a long period of time even when the second electrical device is disposed in the sealed space so as to be protected from submergence, because the floating-body type wind turbine power generating apparatus in particular is often disposed in a severe surrounding environment. For instance, in the case of a floating-body type wind turbine power generating apparatus disposed on the ocean, the ambient temperature varies greatly, and the amount of corrosive substances included in the ambient air is large. Thus, the seal for forming the sealed space may deteriorate in a short period of time. In contrast, the above floating-body type wind turbine power generating apparatus is configured so that the second electrical device is always exposed above the water even upon submergence of the wind turbine, which makes it possible to protect the second electrical device from submergence securely. Further, the second electrical device is configured to be movable relative to the tower in the vertical direction, which makes it possible to locate the second electrical device at an appropriate position upon normal operation of the wind turbine.

In some embodiments, the second electrical device is housed in an electrical-device box having a float floating on the water surface, upon the submergence of the wind turbine.

The electrical-device box housing the second electrical device is configured to float on the water surface due to the float, which makes it possible to move the second electrical device relative to the tower in the vertical direction without using a power, and to securely position the second electrical device above the water surface.

In some embodiments, the electrical-device box may include a guide member which contacts an inner circumferential surface or an outer circumferential surface of the tower, and the electrical-device box may be configured to be guided along the tower by the guide member upon the submergence of the wind turbine.

As described above, providing the guide member for guiding the electrical-device box along the tower makes it possible to prevent the electrical-device box from contacting other components when the electrical-device box moves relative to the tower in the vertical direction, and to cause the electrical-device box to move relative to the tower smoothly.

In some embodiments, the floating body is a semi-submersible type floating body including a plurality of columns and a lower hull which connects the plurality of columns to one another, the plurality of columns including a first column on which the wind turbine is disposed, and the wind turbine may be configured to be submersible by feeding ballast water into at least one of the tower, the plurality of columns or the lower hull.

As described above, submerging the wind turbine by feeding the ballast water makes it possible to reduce power required for submergence.

In some embodiments, the nacelle may be fixed on an upper part of the tower so as to be immovable with respect to the tower, and the tower may have an elliptical cross section.

As described above, it is possible to use a tower having an elliptical cross section by configuring the nacelle immovable with respect to the tower, which in consequence makes it possible to provide a wind turbine power generating apparatus with a high attitude stability which is unlikely to sway due to waves and tidal current.

In some embodiments, the floating-body type wind turbine power generating apparatus may further include a drainage pump disposed inside the tower for discharging the ballast water fed into an interior space of the tower to an outside of the tower, and a float for floating the drainage pump on a surface of the ballast water.

As described above, with the drainage pump for discharging the ballast water fed into the interior space of the tower to the outside of the tower, it is possible to easily surface the submerged wind turbine by feeding the ballast water. Further, the drainage pump is configured so as to float on the water surface due to the float, which makes it possible to prevent the drainage pump from being submerged and being out of order.

In some embodiments, the tower may include a water supply-and-drainage opening into which a ballast-water tube used to transfer the ballast water between the interior space of the tower and the outside of the tower is insertable, and the water supply-and-drainage opening may be disposed on a region of the tower which is above the water surface when the wind turbine is submerged.

As described above, with the water supply-and-drainage opening through which the ballast-water tube is insertable disposed in the region of the tower which is above the water surface when the wind turbine is submerged, it is possible to prevent water around the tower from entering the interior space of the tower via the water supply-and-drainage opening. As a result, it is possible to adjust a difference in height between the water surface of the ballast water stored in the interior space of the tower and the water surface around the tower, which makes it possible to appropriately adjust buoyance with the ballast water.

In some embodiments, the wind turbine may further include a ladder disposed on an outer circumferential side of the tower and a ladder cover which covers the ladder, and the ladder may form an access path outside the tower, the access path extending from a lower part of the tower to the nacelle.

In this way, it is possible to access the nacelle using the ladder disposed outside of the tower without entering the interior space of the tower. Thus, it is unnecessary to provide an entrance that opens and closes for entering the interior space of the tower, which makes it possible to form the tower so as to be watertight.

A method of transporting components of a floating-body type wind turbine power generating apparatus according to at least one embodiment of the present invention is for a floating-body type wind turbine power generating apparatus including a floating body floating on a water surface and a wind turbine including: at least one blade; a hub to which the blade is mounted; a tower erected on the floating body; a nacelle disposed on the tower; a first electrical device disposed inside the hub or the nacelle; and a second electrical device connected to the first electrical device via a cable. The method includes: a submergence step of submerging at least a part of the wind turbine; and a component-movement step of moving a component of the wind turbine between a first unloading position of at least one of the at least one blade, the hub or the nacelle, and a second unloading position in a vicinity of the water surface, after the submergence step. In the submergence step, the second electrical device is moved relative to the tower in a vertical direction so that the second electrical device is not submerged.

According to the above method of transporting components of the floating-body type wind turbine power generating apparatus, at least a part of the wind turbine is submerged so that the height of the wind turbine from the water surface is lowered, and thus rocking at the upper part of the wind turbine would not increase to a great extent even when the wind turbine sways due to waves, tidal current, or the like. As a result, it is possible to improve the workability of component transportation at a high altitude such as the blade, the hub or the nacelle. Further, submerging the floating body and the tower under the water enhances the damping effect on the rocking due to waves, tidal current or the like, which makes it possible to further reduce the rocking of the entire wind turbine. Further, in a case where a crane ship is used to move a component between the first unloading position on the wind turbine and the second unloading position in the vicinity of the water surface, the lifting range of the boom of the crane ship may be small, which makes it possible to reduce sway of the boom tip (a position of a hook to which a component is attached) due to rocking of the ship body, and thus to further improve the workability. Still further, since a crane having a boom with a short length is sufficient, the crane ship is less specialized and it is possible to use a ship having a ship body and size with a high versatility.

Further, since the second electrical device is moved relative to the tower in the vertical direction so that the second electrical device does not get underwater when the wind turbine is submerged, it is possible to protect the second electrical device from submergence securely.

In some embodiments, in the component-movement step, a crane ship may be used to move the component between the first unloading position and the second unloading position, and the component may be at least one of the at least one blade, or a drivetrain or a generator housed in the nacelle.

In some embodiments, the at least one blade may be a pair of blades extending in opposite directions from the hub. The method may further include an angular-position adjustment step of adjusting an angular position of the hub so that the pair of blades extends along a horizontal direction, before the submergence step. In the submergence step, the wind turbine is submerged to a position where the pair of blades extending along the horizontal direction is not submerged.

In this way, submerging the wind turbine while the pair of blades is extending along the horizontal direction makes it possible to prevent the blades from being submerged under water.

In some embodiments, in the submergence step, a protection cover may be attached to one of the at least one blade which is close to the water surface.

In this way, it is possible to prevent the blade from being submerged under water.

In some embodiments, the method may further include: a surfacing step of surfacing the wind turbine after the component-movement step; and a drying step of drying the wind turbine after the surfacing step.

In this way, it is possible to restart normal operation of the wind turbine power generating apparatus smoothly.

In some embodiments, the floating-body type wind turbine power generating apparatus may be an offshore wind turbine disposed on ocean. In the submergence step, seawater may be introduced into the wind turbine to submerge at least a part of the wind turbine, and the method may further include a cleaning step of cleaning the wind turbine with fresh water, after the surfacing step and before the drying step.

It is possible to remove corrosive substances included in ocean water after surfacing of the wind turbine even if such corrosive substances have adhered to the wind turbine during submergence of the wind turbine. As a result, it is possible to prevent corrosion of components constituting the wind turbine.

In some embodiments, the method may further include a mooring-disconnection step of removing a mooring line which has an anchor for mooring the floating body from the floating body and attaching the mooring line to a buoy before the submergence step. In the submergence step, the wind turbine may be submerged while the mooring line is detached from the floating body.

In this way, it is possible to prevent interference of the mooring line with the movement of the wind turbine when the wind turbine is submerged, and to submerge the wind turbine smoothly.

Advantageous Effects

According to at least one embodiment of the present invention, upon submergence of the wind turbine, the second electrical device connected to the first electrical device disposed at a high altitude via the cable is movable relative to the tower in the vertical direction. Thus, it is possible to securely prevent the second electrical device from being submerged. Further, since the second electrical device is configured to be movable relative to the tower in the vertical direction, it is possible to locate the second electrical device at an appropriate position during normal operation of the wind turbine.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Now, the schematic configuration of a floating-body type wind turbine power generating apparatus according to the embodiments of the present invention will be described, and then a method of transporting components of the floating-body type wind turbine power generating apparatus will be described.

In FIGS. 1 to 11, a floating-body type wind turbine power generating apparatus having a spar-type floating body is illustrated as an example of a floating-body type wind turbine power generating apparatus. In FIGS. 12 to 17, a floating-body type wind turbine power generating apparatus having a semi-submersible (semi-sub) type floating body is illustrated as an example of a floating-body type wind turbine power generating apparatus. However, a type of a floating body that can be applied to the floating-body type wind turbine power generating apparatus according to the present embodiments and the method of transporting components of the same is not limited to the above.

Figure 1:
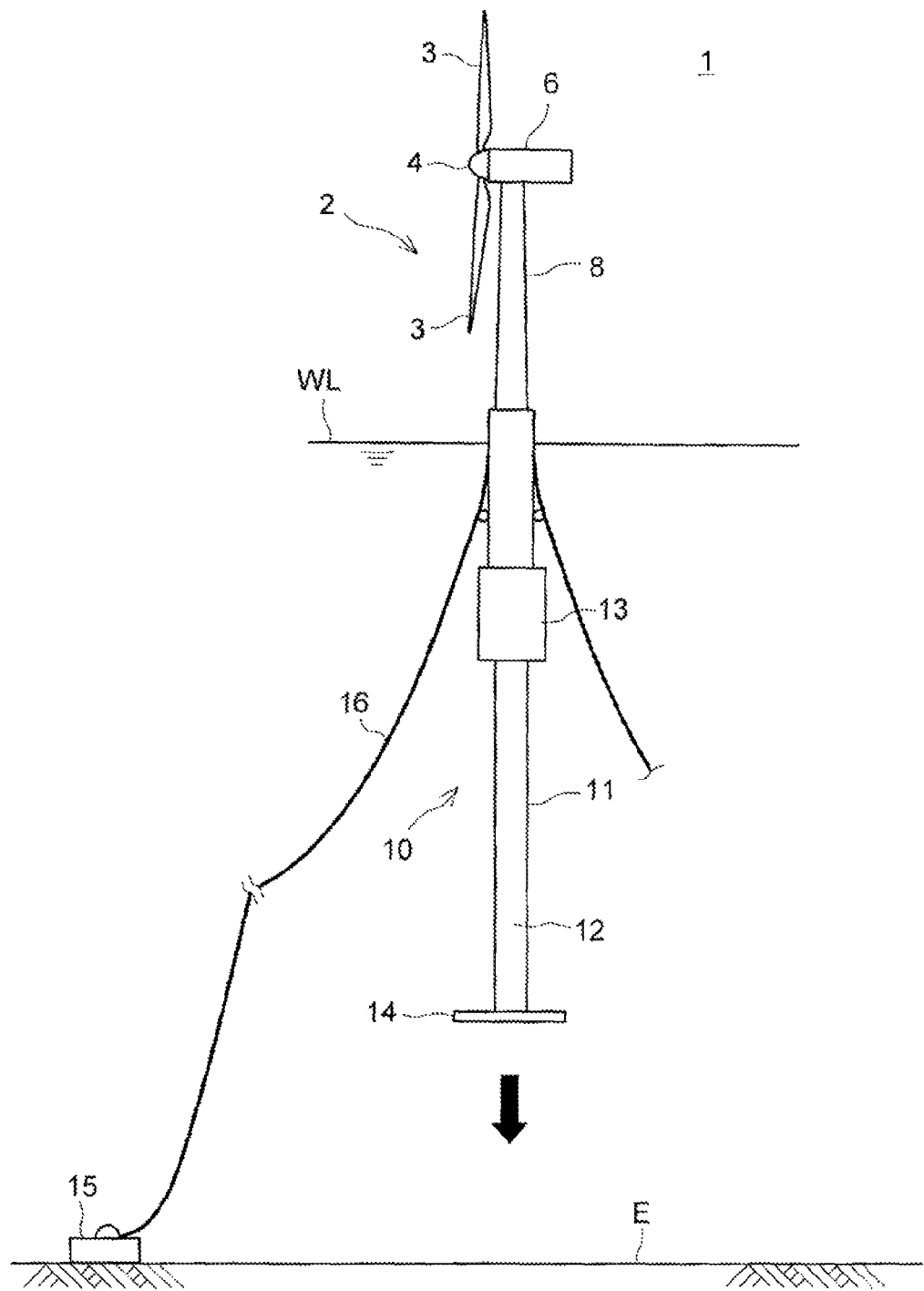
FIG. 1 is a side view of a schematic configuration of a floating-body type wind turbine power generating apparatus according to one embodiment of the present invention.
Figure 2:
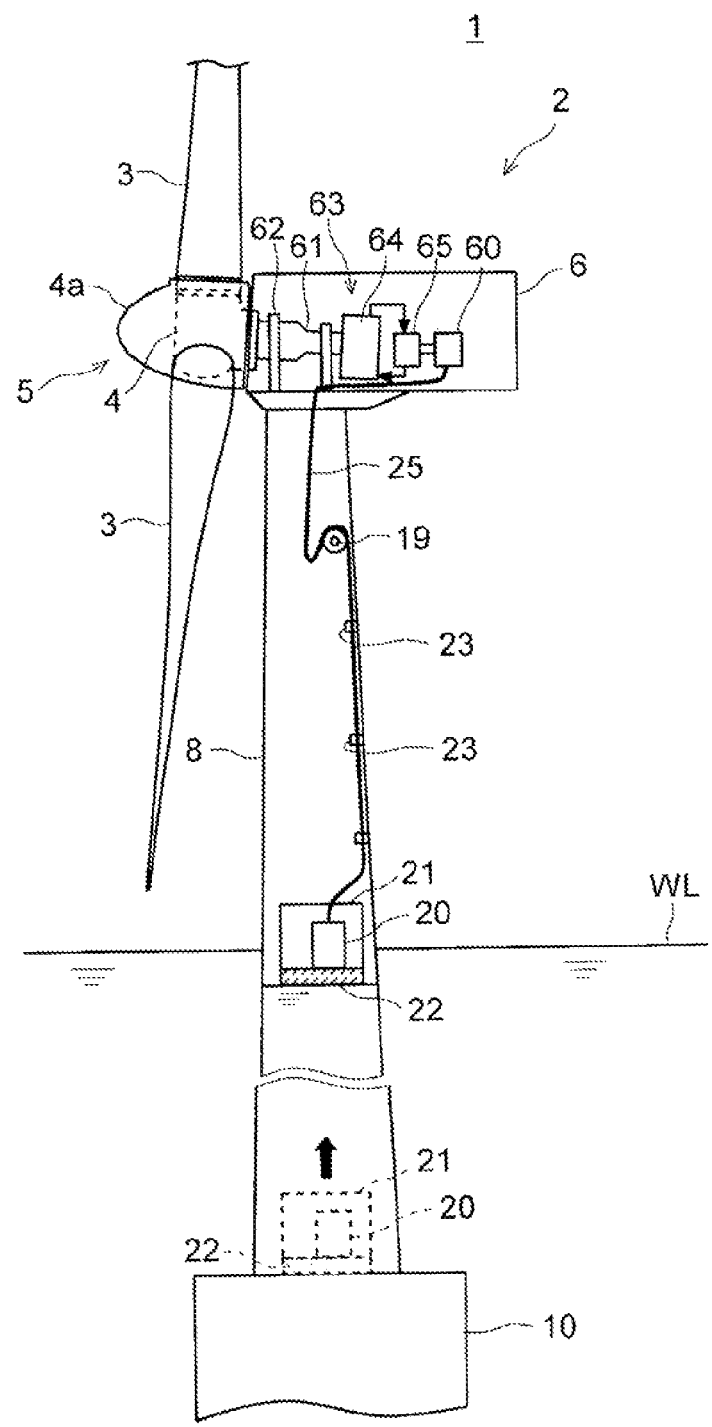
FIG. 2 is a side view of a configuration of components constituting a wind turbine, and a movement mechanism for electrical devices, according to one embodiment of the present invention.
Figure 3:
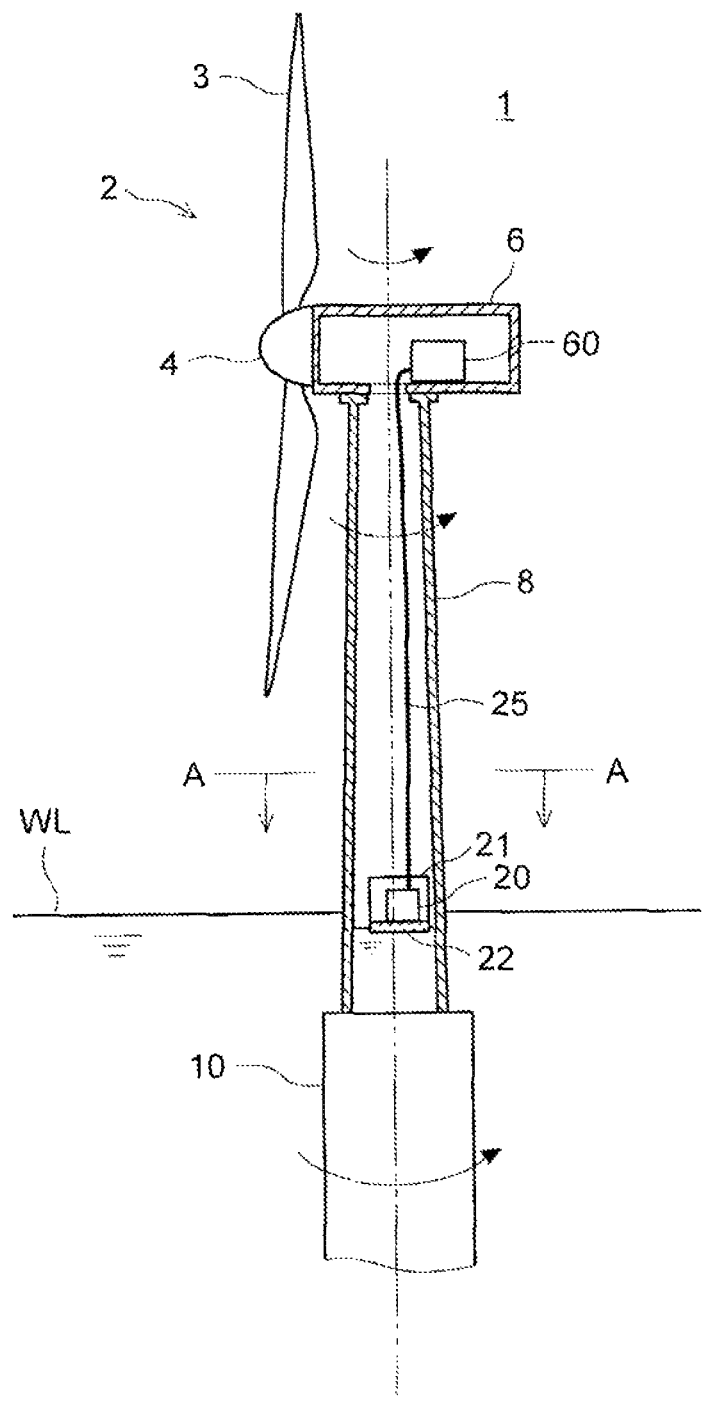
FIG. 3 is a side view of a configuration example of a wind turbine where a nacelle is immovable relative to a tower.
Figure 4:
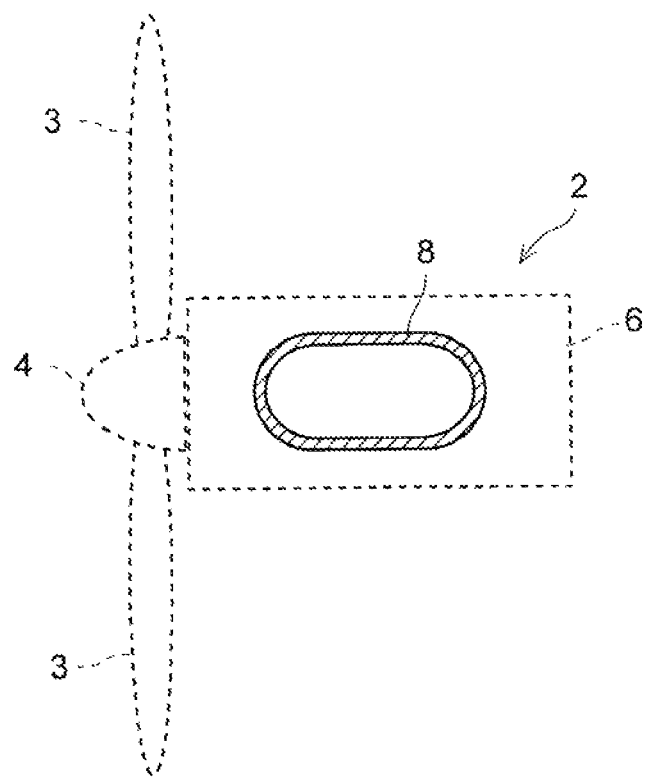
FIG. 4 is a cross-sectional view of FIG. 3 taken along line A-A in the direction of the arrows.
Figure 5:
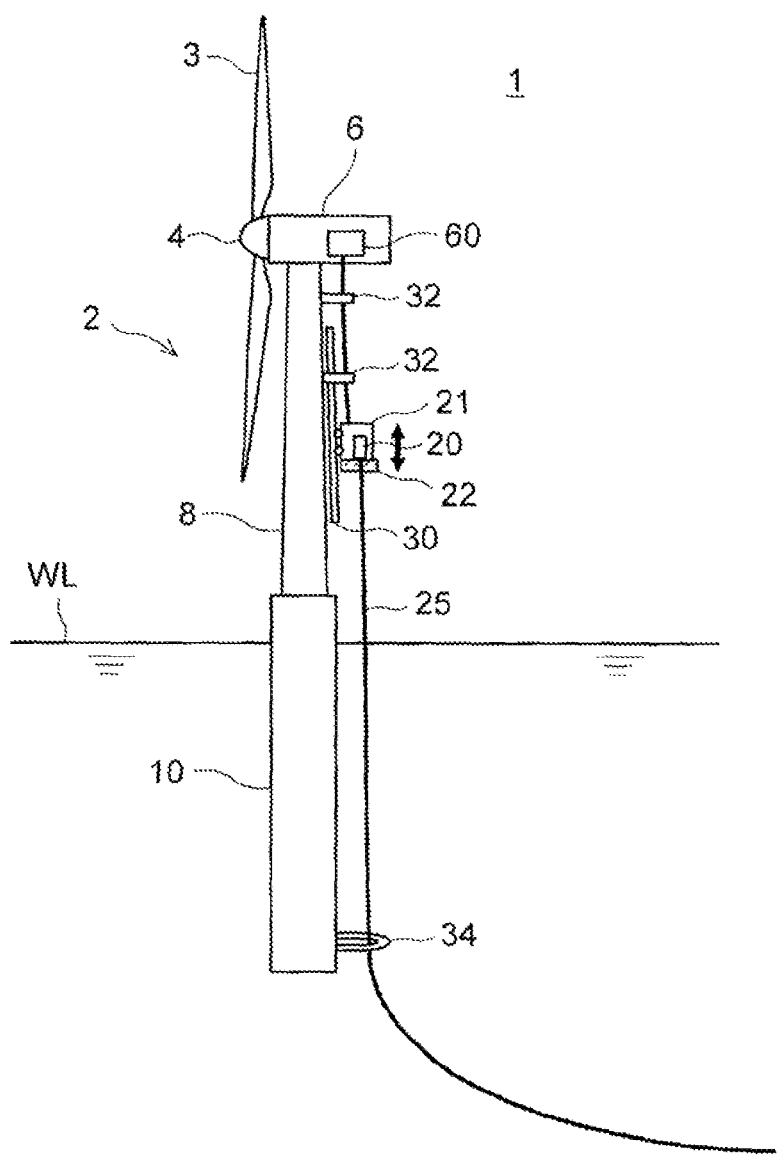
FIG. 5 is a side view of a movement mechanism for electrical devices according to another embodiment of the present invention.
Figure 6:
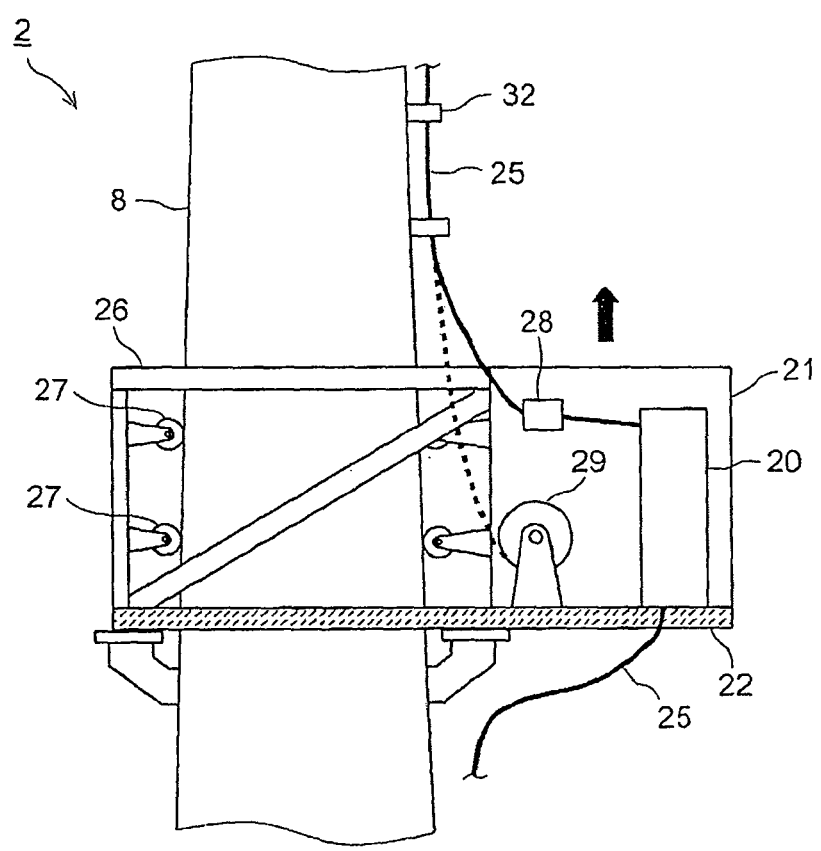
FIG. 6 is a side view of a movement mechanism for electrical devices according to another embodiment of the present invention.

FIG. 1 is a side view of a schematic configuration of a floating-body type wind turbine power generating apparatus according to one embodiment of the present invention. FIG. 2 is a side view of a configuration of components constituting a wind turbine, and a movement mechanism for electrical devices, according to one embodiment of the present invention. FIG. 3 is a side view of a configuration example of a wind turbine where a nacelle is immovable relative to a tower. FIG. 4 is a cross-sectional view of FIG. 3 taken along line A-A in the direction of the arrows. FIGS. 5 and 6 are each a side view of a movement mechanism for electrical devices according to another embodiment of the present invention.

As illustrated in FIGS. 1 and 2, the floating-body type wind turbine power generating apparatus 1 includes a floating body 10 floating on the water surface and a wind turbine 2 erected on the floating body 10.

In one embodiment, the wind turbine 2 includes at least one blade 3 that rotates upon receiving wind, a hub 4 to which the blade 3 is attached, a nacelle 6 to which the hub 4 is rotatably attached, and a tower 8 supporting the nacelle 6. The nacelle 6 may be yaw rotatable relative to the tower 8, and the nacelle 6 normally yaw rotates so that the blade 3 is oriented toward the upwind side in accordance with the wind direction. As the blade 3 rotates upon receiving wind, the generator 60 generates electric power.

In one embodiment, a spar-type floating body 10 includes a main floating body 11 having a vertically-elongated hollow shape, and a balance weight 12 formed on the lower end portion of the main floating body 11. A buoyance member 13 is disposed on the upper part of the submerged section of the floating body 10, and a footing 14 for reducing sway of the floating body 10 is disposed at the lower end of the main floating body 11. Further, a plurality of mooring lines 16 is radially disposed on the main floating body 11 and fixed by anchors 15 arranged on the bottom of the water. Here, the mooring lines 16 each include a chain, a wire rope, a synthetic-fiber rope or combination of the above, a connector such as a shackle, an intermediate buoy or an intermediate sinker, and the like for retaining the position of the floating body 10.

As illustrated in FIG. 3, the upper end of the tower 8 and the bottom part of the nacelle 6 may be fixed to each other so that the nacelle 6 is immovable relative to the tower 8. In such a configuration, the wind turbine 2 yaw rotates with the floating body 10. In this way, it is possible to prevent twist of a cable 25 connecting the first electrical device 60 disposed in the nacelle 6 and the second electrical device 20 disposed in the tower 8.

Further, as illustrated in FIG. 4, in a case where the nacelle 6 is immovable relative to the tower 8, the tower 8 may have an elliptical cross section. With the nacelle 6 being immovable relative to the tower 8, it is possible to employ a tower 8 having an elliptical cross section, which makes it possible to make the wind turbine power generating apparatus 1 have a high attitude stability and be unlikely to sway due to waves and tidal current.

As illustrated in FIG. 2, in one embodiment, the wind turbine 2 includes a rotation shaft 61 coupled to the hub 4, a generator 60 (the first electrical device) for generating electric power, and a drivetrain 63 for transmitting rotation energy of the rotation shaft 61 to the generator 60. While the drivetrain 63 and the generator 60 are disposed in the nacelle 6 in a case illustrated in the drawing for example, at least one of these devices may be disposed in or around the tower 8.

The rotation shaft 61 rotates with a rotor 5 including the blade 3 and the hub 4. Here, the hub 4 may be covered by a hub cover 4a. The rotation shaft 61 is supported on the nacelle 6 rotatably via a pair of bearings 62.

The drivetrain 63 includes a hydraulic pump 64 mounted to the rotation shaft 61 and a hydraulic motor 65 connected to the hydraulic pump 64 via a high pressure oil line and a low pressure oil line. The hydraulic pump 64 is driven by the rotation shaft 61 to increase the pressure of the working oil to produce high pressure working oil (pressurized oil). The pressurized oil produced by the hydraulic pump 64 is supplied to the hydraulic motor 65 via the high pressure oil line, and the hydraulic motor 65 is driven by this pressurized oil. The low pressure working oil having performed work in the hydraulic motor 65 is returned again to the hydraulic pump 64 via the low pressure oil line. Further, the output shaft of the hydraulic motor 65 is connected to the input shaft of the generator 60, so that rotation of the hydraulic motor 65 is inputted into the generator 60. In the drawing, a hydraulic transmission is used as the drivetrain 63 as an exemplary configuration. However, the present invention is not limited to the present configuration. Other drivetrains such as a gearbox may be used, or the rotation shaft 61 and the generator 60 may be connected directly to each other without the drivetrain 63.

The wind turbine 2 includes a submergence unit for submerging at least a part of the wind turbine 2 upon maintenance, installation, deconstruction or the like. With this submergence unit, the wind turbine 2 is submerged in the direction of the arrow in FIG. 1. The specific configuration of the submergence unit will be described later.

Using the submergence unit, for instance, the wind turbine 2 is submerged to move each component illustrated in FIG. 2. As the components to be moved, for instance, besides the rotation shaft 61, the bearings 62, components constituting the drivetrain 63, and the generator 60 disposed in the space inside the nacelle 6 described above, a variety of components can be mentioned, such as the blade 3, the hub cover 4a, components constituting the nacelle 6, and electrical devices such as the control panel. It will be understood that the components to be moved may be a variety of components disposed in the upper space of the tower 8. Further, components used for maintenance are also included. As a matter of course, the wind turbine 2 may be submerged during a work which does not involve transportation of components.

As illustrated in FIG. 2, the floating-body type wind turbine power generating apparatus 1 includes a movement mechanism for moving the second electrical device 20 relative to the tower 8 in the vertical direction. With this moving mechanism, the second electrical device 20 moves relative to the tower in the vertical direction so as not to be underwater when the wind turbine 2 is submerged. Here, the second electrical device 20 is an electrical device connected to the first electrical device 60 disposed in the hub 4 or the nacelle 6 via a cable 25. As the first electrical device 60, for instance, the generator, the drivetrain (hydraulic transmission) 63 or the control panel inside the nacelle 6, the pitch control device or the control panel in the hub 4, or other auxiliary devices can be mentioned. Further, as the second electrical device 20, for instance, a switch gear, a transformer, an inverter, a control panel, or other auxiliary devices can be mentioned.

In one embodiment, when the wind turbine 2 is submerged, the movement mechanism is housed in an electrical-device box 21 including a float 22 that floats on the water surface WL. Specifically, the float 22 is mounted to a lower part of the electrical-device box 21 so that the second electrical-device 20 is housed above the float 22. The electrical-device box 21 may be configured to have air tightness. The cable 25 connecting the first electrical device 60 and the second electrical device 20 extends inside the tower 8. The cable 25 may be inserted through a clamp 23 mounted to the inner circumferential face of the tower 8, so that the cable 25 does not move about when the electrical-device box 21 is being moved. In this case, the cable 25 is inserted through the clamp 23 so as to be movable in the vertical direction. There may be provided a plurality of clamps 23. A cable roller 19 may be disposed above the uppermost one of the plurality of clamps 23. The cable roller 19 guides the cable 25 disposed along the inner circumferential face of the tower 8 by the clamp 23 toward the center of the tower 8, and absorbs the looseness of the cable 25 that may be caused when the distance between the first electrical device 60 and the second electrical device 20 is varied due to the vertical movement of the second electrical device 20.

With the above configuration, the electrical-device box 21 housing the second electrical device 20 is configured to float on the water surface due to the float 22, which makes it possible to move the second electrical device 20 relative to the tower 8 in the vertical direction without using a power, and to securely position the second electrical device 20 above the water surface WL.

Further, as illustrated in FIGS. 5 and 6, the movement mechanism for the second electrical device 20 may be disposed on the outer circumferential side of the tower 8. Here, the second electrical device 20 is housed within the electrical device box 21 having the float 22 as described above.

In FIG. 5, the electrical-device box 21 moves in the vertical direction relative to the tower 8 along a guide rail 30 mounted to the outer circumferential face of the tower 8. A plurality of clamps 32 is mounted to the outer circumferential surface of the tower 8 in the vertical direction, and the cable 25 connecting the first electrical device 60 and the second electrical device 20 is arranged so as to be inserted through each clamp 32.

In FIG. 6, the electrical-device box 21 is coupled to a frame 26 disposed so as to surround the tower 8. A plurality of guide rollers 27 which slides on the outer circumferential surface of the tower 8 is mounted to the frame 26. Further, the cable 25 may be connected to the second electrical device 20 via a junction box 28. Further, a cable reel 29 for winding the cable 25 removed from the junction box 28 may be disposed inside the electrical-device box 21. Here, when the wind turbine 2 is submerged, the wind turbine 2 may be submerged while the cable is being removed from the clamp 32.

As described above, with the guide rail 30 and the frame 26 with the guide rollers, for instance, the electric-device box 21 is configured to be guided along the tower 8, which makes it possible to move the electrical-device box 21 relative to the tower 8 smoothly, and to restrict sway of the electrical-device box 21 due to waves or tidal current. Here, the above movement mechanism may be disposed on the inner circumferential side of the tower 8. Further, the cable 25 extending from the second electrical device 20 to outside may extend to the water bottom via a guide 34 disposed on the floating body 10. The guide 34 is, for instance, configured in a ring shape so that the cable 25 is inserted through the guide 34 in the vertical direction. In this way, even when the second electrical device 20 is moved relative to the tower 8 in the vertical direction, it is possible to support the cable 25 to the tower 8 stably with the guide 34.

Figure 7:
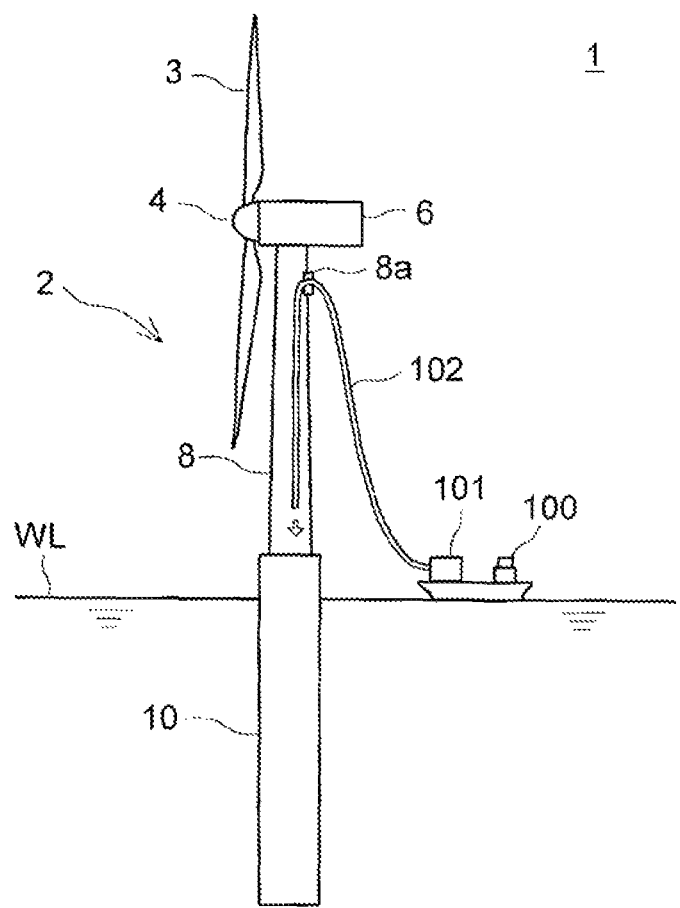
FIG. 7 is a diagram for describing a configuration for feeding ballast water into an interior space of a tower.
Figure 8:
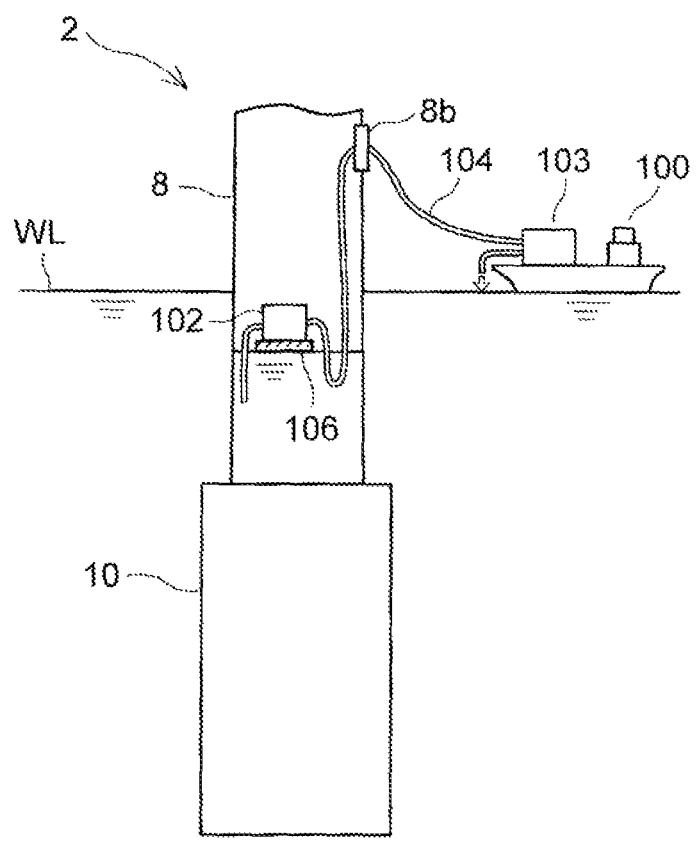
FIG. 8 is a diagram for describing a configuration for discharging ballast water from an interior space of a tower.

Next, with reference to FIGS. 7 and 8, the submergence unit for the wind turbine 2 will be described. FIG. 7 is a diagram for describing a configuration for feeding ballast water into an interior space of a tower. FIG. 8 is a diagram for describing a configuration for discharging ballast water from an interior space of a tower.

As a submergence unit for the wind turbine 2, a configuration for adjusting buoyance of the floating-body type wind turbine power generating apparatus 1 with ballast water stored in the interior space of the tower 8 may be used. In this case, the lower part of the tower 8, which is a tower region to which the water surface WL may reach upon submergence, is formed in a substantially watertight state. For instance, an opening/closing part such as a door or the like disposed in the tower region to which the water surface WL may reach upon submergence has a structure with a high water tightness.

As illustrated in FIG. 7, in one embodiment, a feed-water inlet 8a is disposed on the tower 8 so as to be positioned in a tower region above the water surface WL when the wind turbine 2 is submerged. A hose 102 for feeding the ballast water to the interior space of the tower 8 is inserted through the feed-water inlet 8a. The hose 102 is connected to a pump 101 boarded on a ship (for instance, a pump ship) 100, so that the ballast water is fed to the interior space of the tower 8 from the hose 102 by driving the pump 101.

As described above, with the feed-water inlet 8a through which the hose 102 is insertable disposed in the region of the tower 8 which is above the water surface WL when the turbine 2 is submerged, it is possible to prevent water around the tower from entering the interior space of the tower 8 via the feed-water inlet 8a. As a result, it is possible to adjust a difference in height between the water surface of the ballast water stored in the interior space of the tower 8 and the water surface WL around the tower, which makes it possible to appropriately adjust buoyance with the ballast water.

As illustrated in FIG. 8, in one embodiment, a drainage outlet 8b is disposed on the tower 8 so as to be positioned in the tower region above the water surface WL when the wind turbine 2 is submerged. Here, the feed-water inlet 8a and the drainage outlet 8b may be the same opening. A hose 104 for discharging the ballast water from the interior space of the tower 8 to outside is inserted through the drainage outlet 8b. The hose 104 is connected to a pump 103 boarded on the ship (for instance, a pump ship) 100, and to a pump 102 disposed in the interior space of the tower 8. The pumps 102, 103 are driven to discharge the ballast water from the interior space of the tower 8 via the hose 104. Further, the pump 102 disposed in the interior space of the tower 8 may be disposed on a float 106.

As described above, with the pumps 102, 103 for discharging the ballast water fed into the interior space of the tower 8 to outside of the tower 8 provided, it is possible to easily surface the wind turbine 2 in a submerged state by feeding the ballast water. Further, the pump 102 disposed in the tower 8 is configured so as to float on the water surface due to the float 106, which makes it possible to prevent the pump 102 from being submerged and being out of order.

Figure 9:
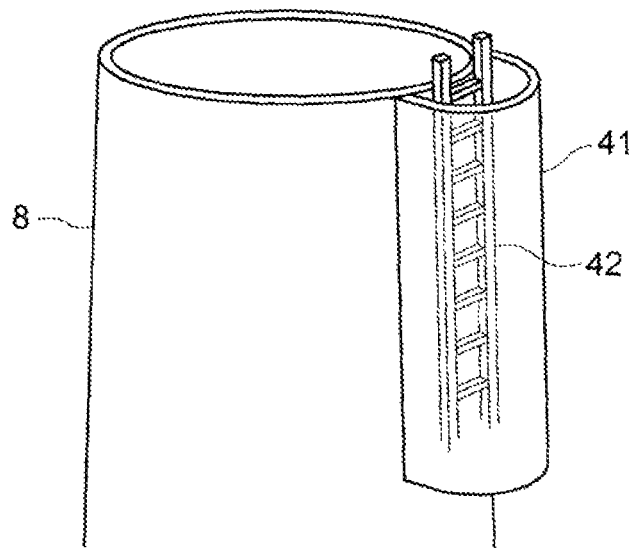
FIG. 9 is a perspective view of a ladder disposed on the outer circumferential side of the tower.
Figure 10:
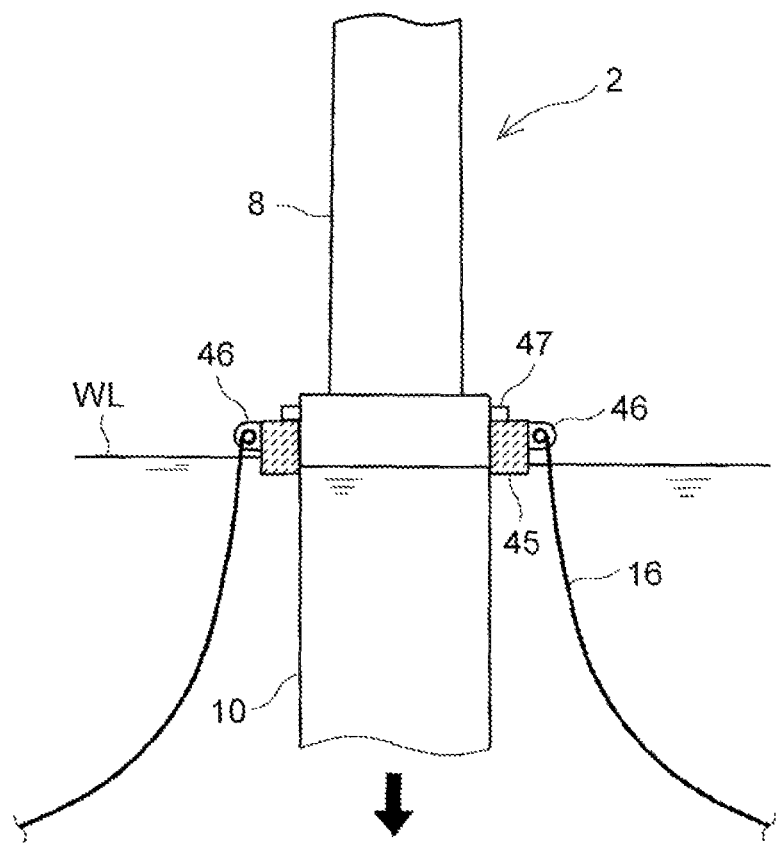
FIG. 10 is a diagram for describing a configuration for yaw rotating the tower.

In addition to the above configuration, the floating-body type wind turbine power generating apparatus 1 according to the present embodiment may further include a configuration illustrated in FIGS. 9 and 10. FIG. 9 is a perspective view of a ladder disposed on the outer circumferential side of the tower. FIG. 10 is a diagram for describing a configuration for yaw rotating the tower.

As illustrated in FIG. 9, the wind turbine 2 may further include a ladder 42 disposed on the outer circumferential side of the tower 8, and a ladder cover 41 covering the ladder 42. The ladder 42 is disposed so as to extend along an access path extending from the lower part of the tower 8 to the nacelle 6. In this way, it is possible to access the nacelle 6 using the ladder 42 disposed on the outer circumferential side of the tower 8 without entering the interior space of the tower 8. Thus, it is unnecessary to provide an entrance that opens and closes for entering the interior space of the tower 6, which makes it possible to improve water tightness of the tower 8.

As illustrated in FIG. 10, the wind turbine 2 may further include a chain ring 45 disposed so as to surround the outer circumference of the tower 8, and a yaw rotation mechanism 47 for yaw rotating the tower 8 relative to the chain ring 45. The chain ring 45 is mounted to the outer circumferential surface of the tower 8 slidably in the vertical direction. Further, the chain ring 45 has buoyance so as to stay on the water surface WL even when the tower 8 moves in the vertical direction (submerges or surfaces) with respect to the water surface WL. Hooks 46 are mounted to the chain ring 45, and the mooring lines 16 are connected to the hooks 46. Since the chain ring 45 is always maintained on the water surface WL, the tension of the mooring lines 16 attached to the hooks 46 hardly changes even when the wind turbine 2 submerges or surfaces. In a case where the wind turbine 2 is yaw rotated during normal operation or the like of the wind turbine 2, the yaw rotation mechanism 47 is driven with reference to the chain ring 45. In this way, it is possible to perform yaw rotation of the wind turbine 2 smoothly. Here, the above configuration is used suitably when the nacelle 6 is immovable relative to the tower 8, as illustrated in FIGS. 3 and 4.

Figure 11A:
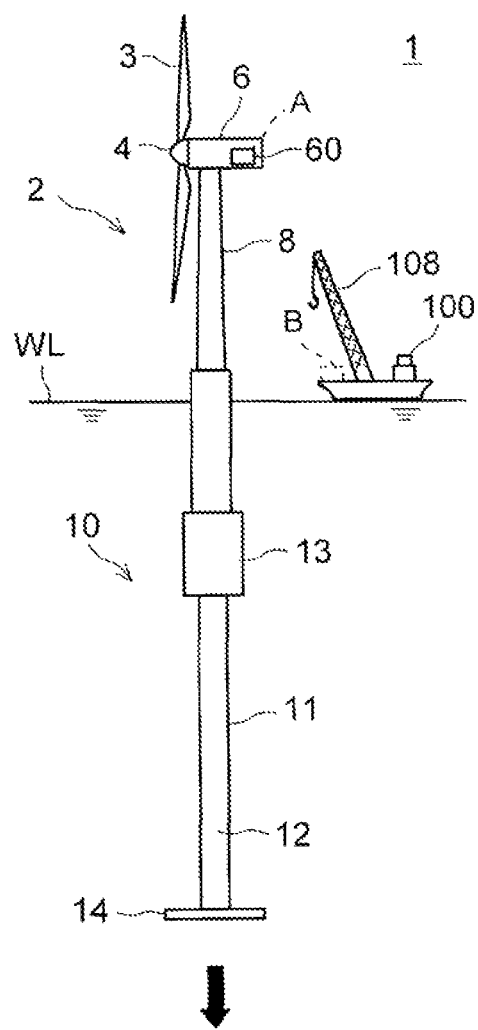
FIGS. 11A and 11B are diagrams for illustrating a component-transportation flow of a floating-body type wind turbine power generating apparatus according to one embodiment.
Figure 11B:
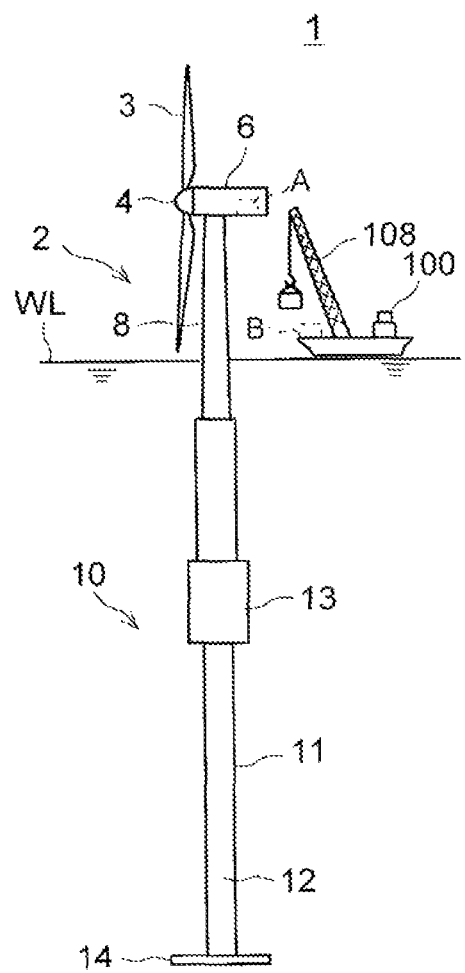

Now, with reference to FIGS. 11A and 11B, a component transportation flow of a floating-body type wind turbine power generating apparatus according to one embodiment will be described in detail. FIGS. 11A and 11B are diagrams for illustrating a component-transportation flow of a floating-body type wind turbine power generating apparatus according to one embodiment. Transportation of the first electrical device 60 from the floating-body type wind turbine power generating apparatus 1 to the ship 100 will be described here as an example. The first electrical device 60 is located at the first unloading position A of the nacelle 6.

As illustrated in FIG. 11A, when the ship (pump ship) 100 approaches the wind turbine 2 during maintenance or the like, the wind turbine 2 is moved in the direction of the arrow in the drawing, and at least a part of the wind turbine 2 is submerged. At this time, the second electrical device 20 is moved relative to the tower 8 upward in the vertical direction so as not to be underwater by one of the above described movement mechanisms (see FIGS. 2, 5, and 6). Then, as illustrated in FIG. 11B, while a state in which at least a part of the wind turbine 2 is submerged under the water surface WL is maintained, the first electrical device 60 is moved between the first unloading position A on the wind turbine 2 and the second unloading position B in the vicinity of the water surface. To move the first electrical device 60, a ship (crane ship) 100 equipped with a crane 108 is used, for instance. Here, to move the first electrical device 60, a lifting device (not illustrated) such as a crane and a winch disposed on the wind turbine 2 may be used.

According to the method of transporting components of the floating-body type wind turbine power generating apparatus 1 described above, at least a part of the wind turbine 2 is submerged so that the height of the wind turbine 2 from the water surface WL is lowered, which prevents rocking at the upper part of the wind turbine 2 from increasing to a great extent even when the wind turbine 2 sways due to waves, tidal current, or the like. As a result, it is possible to improve the workability of component transportation at a high altitude such as the blade 3, the hub 4 or the nacelle 6. Further, submerging the floating body 10 and the tower 8 under the water enhances the damping effect on the rocking due to waves, tidal current or the like, which makes it possible to further reduce the rocking of the entire wind turbine 2. Further, in a case where the crane ship 100 is used to move a component between the first unloading position A on the wind turbine 2 and the second unloading position B in the vicinity of the water surface WL, the lifting range of the boom of the crane ship 100 may be small, which makes it possible to reduce sway of the boom tip (a position of a hook to which a component is attached) due to rocking of the ship body, and thus to further improve the workability. Still further, since a crane having a boom with a short length is sufficient, the crane ship 100 may be less specialized and it is possible to use a ship 100 having a ship body and size with a high versatility.

Further, since the second electrical device 20 is moved relative to the tower 8 in the vertical direction so that the second electrical device 20 does not get underwater when the wind turbine 2 is submerged, it is possible to protect the second electrical device 20 from submergence securely.

Here, in the above embodiments, the above process is performed in the reversed order when the first electrical device 60 is moved from the ship 100 to the floating-body type wind turbine power generating apparatus 1.

Further, after the second electrical device 20 is moved, the wind turbine 2 may be surfaced to be dried. The interior space of the tower 8 is dried in particular. As a drying method, for instance, hot air may be supplied to the interior space of the tower 8 to increase the temperature of the interior space. In this way, it is possible to restart the normal operation of the wind turbine power generating apparatus 1 smoothly.

Further, in a case where the floating-body type wind turbine power generating apparatus is installed on the ocean, the wind turbine 2 may be cleaned with fresh water before being dried. In this way, even if corrosive substances included on ocean water have adhered to the wind turbine 2 during submergence of the wind turbine 2, it is possible to remove such corrosive substances after surfacing of the wind turbine 2. As a result, it is possible to prevent corrosion of components constituting the wind turbine 2.

Furthermore, before the wind turbine 2 is submerged, the mooring lines 16 with the anchors for mooring the floating body 10 may be removed from the floating body 10, and the mooring lines 16 may be attached to buoys. In this case, when the wind turbine 2 is submerged, the wind turbine 2 may be submerged while the mooring lines 16 are detached from the floating body 10. In this way, it is possible to prevent interference of the mooring lines 16 with the submerging motion, and to submerge the wind turbine 2 smoothly when the wind turbine 2 is submerged.

Figure 12:
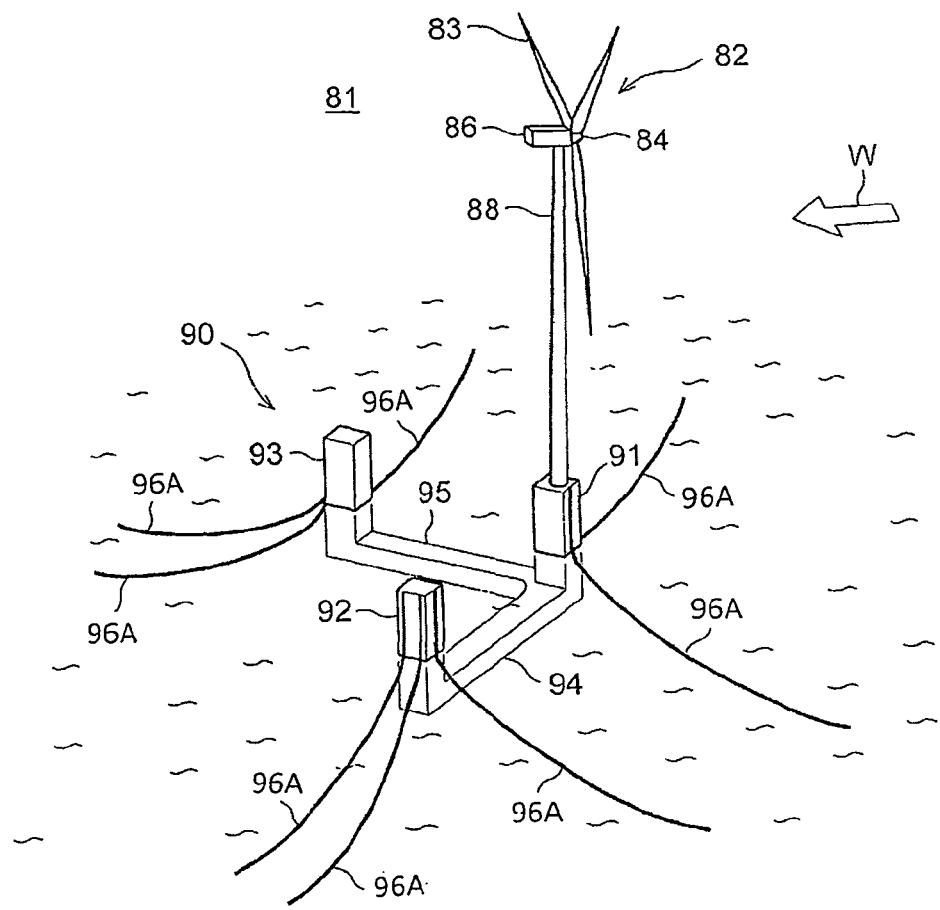
FIG. 12 is a perspective view of a state where the floating-body type wind turbine power generating apparatus according to another embodiment of the present invention is moored on the ocean.
Figure 13A:
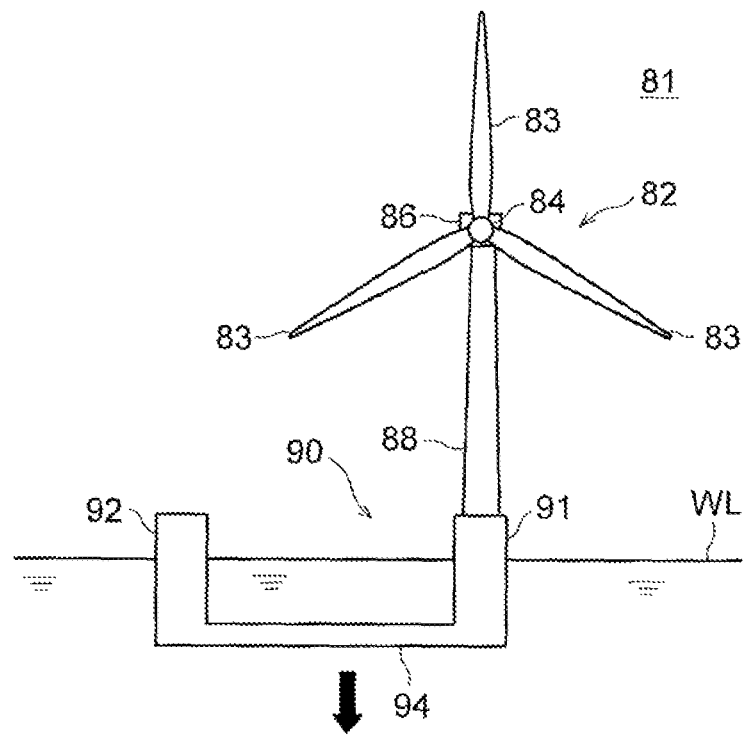
FIGS. 13A and 13B are diagrams for illustrating a submergence flow of a floating-body type wind turbine power generating apparatus according to another embodiment.
Figure 13B:
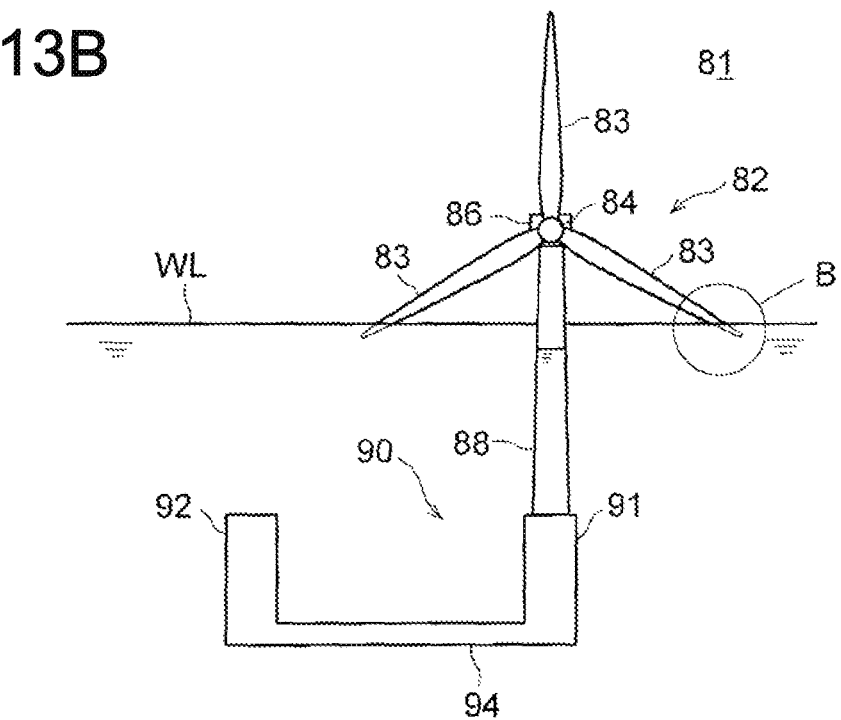
Figure 14:
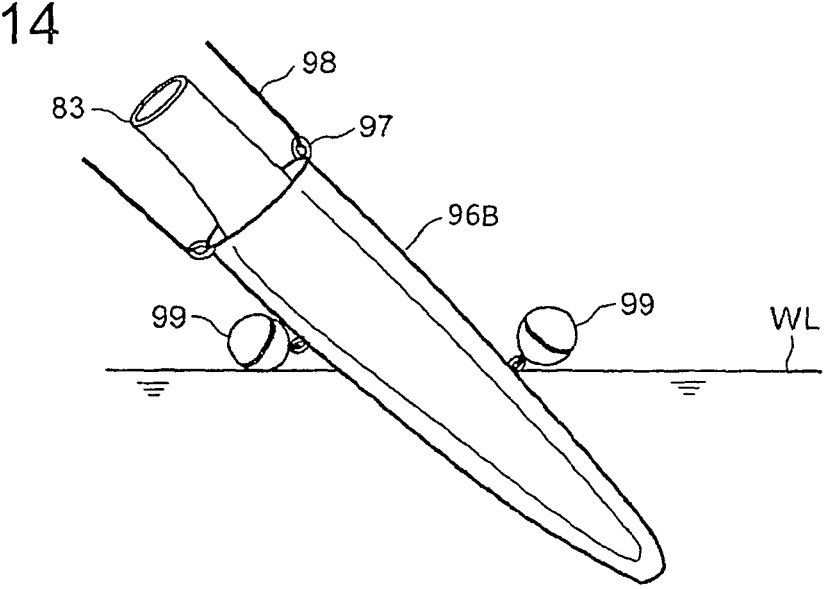
FIG. 14 is an enlarged view of section B from FIG. 13B.

In another embodiment, the floating-body type wind turbine power generating apparatus 1 may include configurations illustrated in FIGS. 12 to 17. FIG. 12 is a perspective view of a state where the floating-body type wind turbine power generating apparatus according to another embodiment of the present invention is moored on the ocean. FIGS. 13A and 13B are diagrams for illustrating a submergence flow of a floating-body type wind turbine power generating apparatus according to another embodiment. FIG. 14 is an enlarged view of section B from FIG. 13B. FIGS. 15A and 15B are diagrams for describing a method of adjusting the attitude of a floating-body type wind turbine power generating apparatus according to another embodiment. FIGS. 16A and 16B are diagrams for describing a submergence flow of a floating-body type wind turbine power generating apparatus according to another embodiment. FIGS. 17A and 17B are diagrams for describing a submergence flow of a floating-body type wind turbine power generating apparatus according to yet another embodiment.

Here, in FIGS. 12 to 17, only the submergence unit for a floating-body type wind turbine power generating apparatus of a semi-sub type and related configurations are illustrated, and the first electrical device 60, the second electrical device 20, the movement mechanism for the second electrical device 20 and the like are not illustrated.

As illustrated in FIGS. 12 and 13, in one embodiment, a floating-body type wind turbine power generating apparatus 81 includes a floating body 90 floating on the water surface WL and a wind turbine 82 erected on the floating body 90.

The wind turbine 82 includes at least one blade 83, a hub 84 to which the blade 83 is mounted, a nacelle 86 to which the hub 84 is mounted, and a tower 88 supporting the nacelle 86 so as to be yaw rotatable.

The floating body 10 includes three columns 91, 92, 93 each having a column shape disposed on the vertex positions of a virtual triangle in a planar view, and further includes the first lower hull 94 of an elongated shape connecting the first column 91 and the second column 92, and the second lower hull 95 of an elongated shape connecting the first column 91 and the third column 93. The three columns 91, 92, 93, and the two lower hulls 94, 95 form the floating body 90 into a substantially V shape in a planar view. On the upper surface of the first column 91 disposed at the center of the substantially V shape in a planar view, the above described wind turbine 92 is disposed.

Further, the above three columns 91, 92, 93 may be disposed on the vertex positions of a virtual isosceles right triangle which is symmetric with respect to a bisector of an intersection angle of the first lower hull 94 and the second lower hull 95, the first lower hull 94 and the second lower hull 95 interesting with each other at a right angle.

Further, although not illustrated in particular, the floating body 90 may further include the third lower hull connecting the second column 92 and the third column 93. Still further, the first lower hull 94 and the second lower hull 95 may be coupled to one another by a beam member for reinforcement.

In the above embodiment, the lower hulls 94, 95 are illustrated as joints for respectively connecting the first column 91 and the second column 92, and the first column 91 and the third column 93. However, joints are not limited to the above.

In one embodiment, a ballast chamber (not illustrated) for storing ballast water inside may be formed inside the floating body 90. The ballast chamber is disposed in an interior space of at least one of the columns 91, 92, 93 or the lower hulls 94, 95. Further, the ballast chamber may be divided into a plurality of sections in the extending direction of the lower hulls 94, 95, which makes it possible to form a buoyance distribution in the extending direction of the lower hulls 94, 95 and to control the attitude of the wind turbine 2 appropriately. The ballast water is fed into the ballast chambers so that the floating body 90 is moored on the water surface while the draft line (water surface) WL is positioned above the upper faces of the lower hulls 94, 95. Further, the ballast chamber may be used as a submergence unit of the wind turbine 2. In this case, the ballast water is fed into the ballast chamber so as to achieve buoyancy at which at least a part of the wind turbine 2 is submerged. In a case where the ballast chamber is divided into a plurality of sections in the extending direction of the lower hulls 94, 95, the volume of the ballast water in each ballast chamber may be adjusted so that the wind turbine 2 sinks downward in the vertical direction while maintaining a horizontal state. Here, when the wind turbine 2 is submerged, the ballast water is fed also to the interior space of the tower 8, which means that this interior space constitutes one of the ballast chambers.

Further, the floating body 90 may be disposed so that the first column 91, on the upper face of which the wind turbine 82 is disposed, is positioned at the upwind side with respect to the main wind direction W. In this case, the second column 92 and the third column 93 are disposed so as to be positioned at the downwind side of the first column 91 with respect to the main wind direction W. In this way, locating the first column 91, on which the wind turbine 2 is disposed, at the upwind side with respect to the main wind direction W, makes it possible to increase the stability of the wind turbine 82 when the wind turbine 82 is about to incline backward upon receiving a wind load.

Further, as illustrated in FIG. 12, to the floating body 80, a plurality of mooring lines 96 coupled to anchors (not illustrated) fixed to the water bottom E may be connected in a catenary fashion so as to form catenary curves. In this case, the floating body 90 is moored on the ocean by the anchors and the mooring lines 96, resisting a drift force and a rotational moment applied to the floating body 90.

As illustrated in FIG. 13A, while the tower 88 is positioned above the water surface WL, the ballast water is fed into the interior space of the tower 88 and the ballast chamber of the floating body 90, and thereby the wind turbine 82 is submerged with the floating body 90 so that at least a part of the wind turbine 82 is submerged as illustrated in FIG. 13B. At this time, the volume of ballast water may be adjusted so that the floating body 90 sinks while maintaining a horizontal state.

In a case where the wind turbine 82 includes three blades 83 extending in a radial fashion as illustrated in FIG. 13B, a part of the blade 83 disposed at the lower side may become submerged with the tower 88. In such a case, a protection cover 96 may be mounted to the blade 83 in the vicinity of the water surface WL as illustrated in FIG. 14. The protection cover 96 is formed from a waterproof material. Further, a hook 97 may be attached to the protection cover 96 to suspend the protection cover 96 toward the hub 84 on a wire 98 so that the protection cover 96 does not fall off. Further, a float 99 may be attached to the protection cover 96.

Figure 15A:
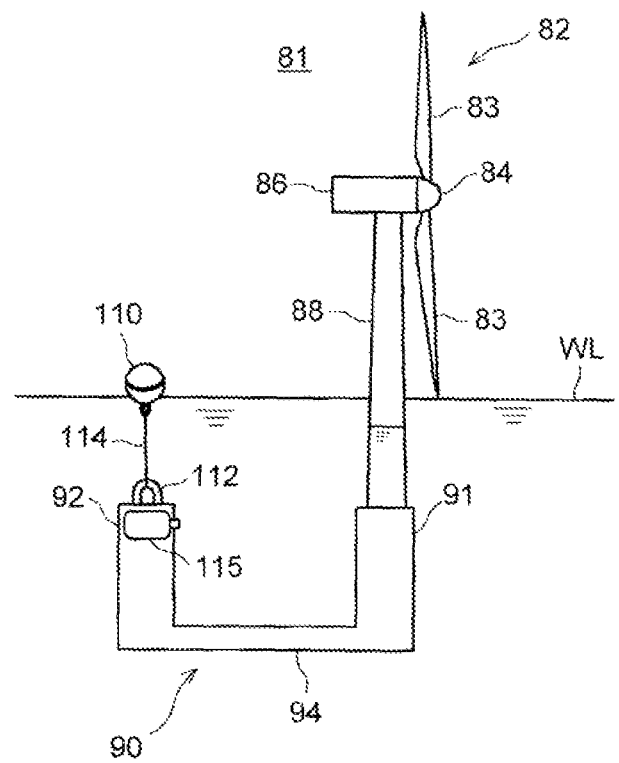
FIGS. 15A and 15B are diagrams for describing a method of adjusting the attitude of a floating-body type wind turbine power generating apparatus according to another embodiment.

Moreover, as illustrated in FIG. 15A, a float 110 may be used to adjust the attitude upon submergence or surfacing of the floating-body type wind turbine power generating apparatus 81 so that the floating body 90 moves in the vertical direction in a horizontal state. For instance, a hook 112 may be disposed on each of the second column 92 and the third column 93, and the float 110 is connected to a tip end of a wire 114 attached to each hook 112. Instead of the floats 110, air chambers 115 may be disposed inside the second column 92 and the third column 93, and the air volume inside the air chambers 115 may be adjusted to adjust the attitude.

Figure 15B:
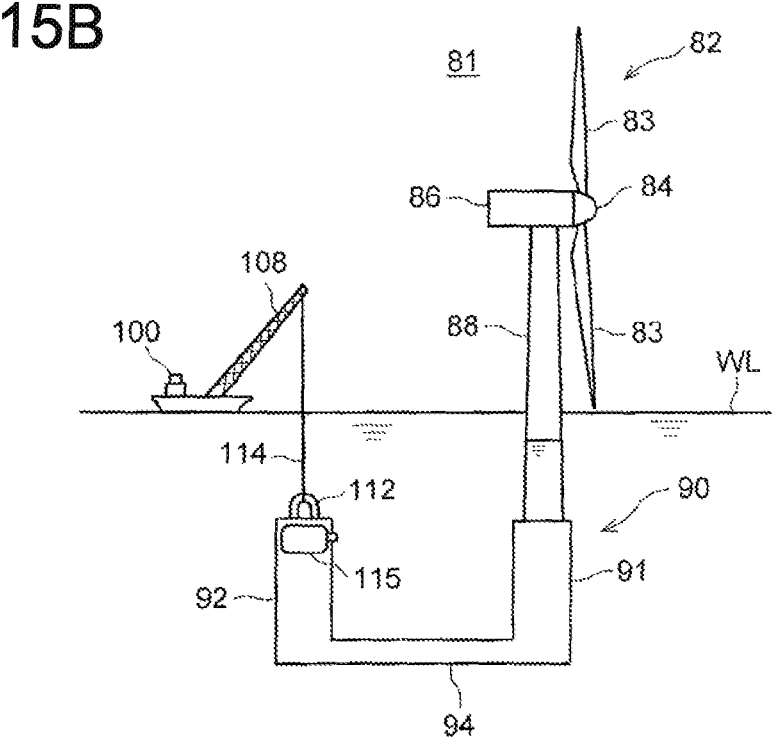

Further, as illustrated in FIG. 15B, to adjust the attitude upon submergence or surfacing of the floating-body type wind turbine power generating apparatus 81, the floating body 90 may be hoisted by a crane 108 boarded on the ship (crane ship) 100 so that the floating body 90 moves in the vertical direction while maintaining a horizontal state. For instance, a wire 114 is fixed to the hook 112 disposed on each of the second column 92 and the third column 93, and the floating body 90 is hoisted upward by the crane 108.

Figure 16A:
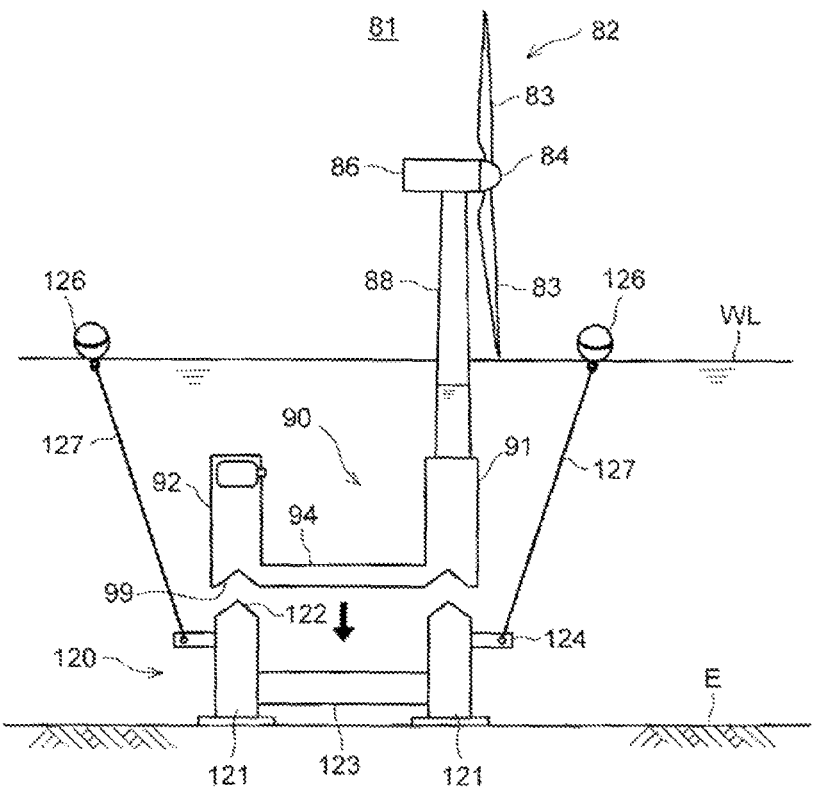
FIGS. 16A and 16B are diagrams for describing a submergence flow of a floating-body type wind turbine power generating apparatus according to another embodiment.
Figure 16B:
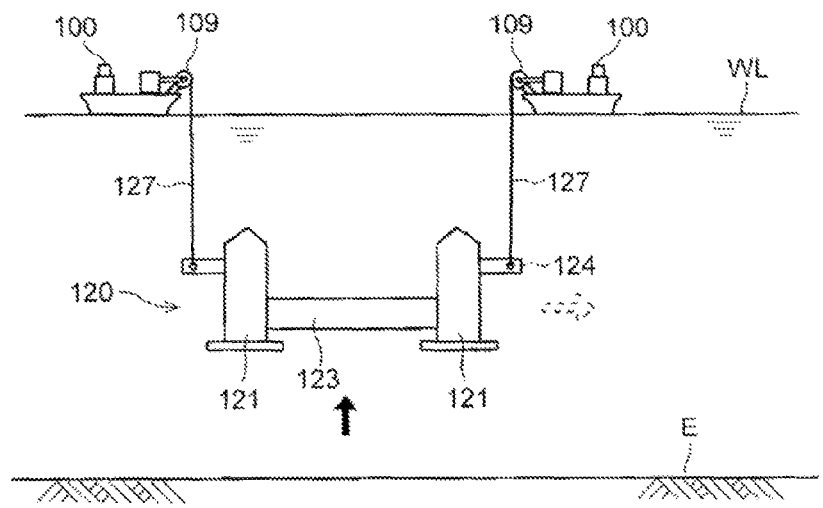

Furthermore, as illustrated in FIGS. 16A and 16B, a floating-body installation base 120 may be disposed on the water bottom E so that the floating body 90 is disposed on the floating-body installation base 120 when the floating-body type wind turbine power generating apparatus 81 is submerged. Specifically, the floating-body installation base 120 includes three support parts 121 supporting the respective columns 91, 92, 93, engagement parts 122 engaging with the bottom surfaces of the respective columns 91, 92, 93, and connection parts 123 connecting the three support parts 121 with one another. As illustrated in FIG. 16A, the floating-body type wind turbine power generating apparatus 81 is submerged until the bottom surfaces of the respective columns 91, 92, 93 engage the engagement parts 122 of the floating-body installation base 120. In this way, it is possible to maintain the attitude of the floating-body type wind turbine power generating apparatus 81 stably upon submergence.

Further, a float 126 may be connected to the tip end of a wire 127 attached to a wire-attachment part 124 of each support part 121. The float 126 is disposed so as to inform workers of the position of the floating-body installation base 120.

Furthermore, the wires 127 attached to the floating-body installation base 120 may be relocated to a lifting mechanism 109 boarded on the ship 100 to shift the floating-body installation base 120 to another location while hoisting the same with the ship 100.

Figure 17A:
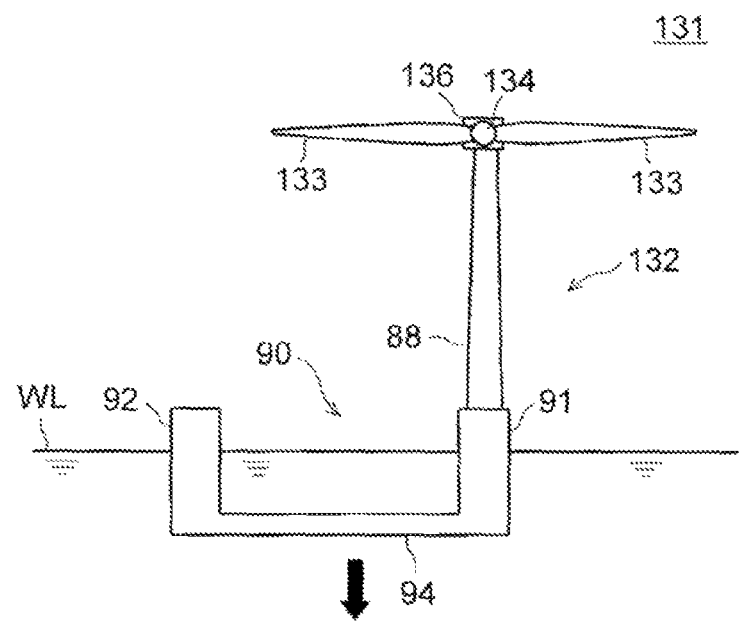
FIGS. 17A and 17B are diagrams for describing a submergence flow of a floating-body type wind turbine power generating apparatus according to yet another embodiment.
Figure 17B:
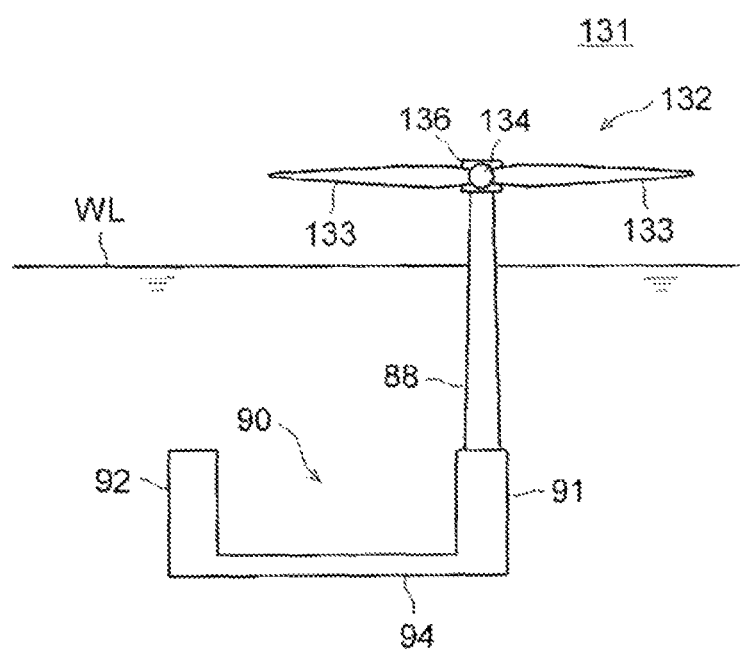

Further, as illustrated in FIGS. 17A and 17B, in a case where a wind turbine 132 of a floating-body type wind turbine power generating apparatus 131 includes a pair of blades 133 extending in opposite directions from a hub 134 attached to a nacelle 136, the angular position of the hub 134 may be adjusted so that the pair of blades 133 extends along the horizontal direction before the wind turbine 131 is submerged, and then the wind turbine 132 may be submerged to a position where the pair of blades 133 does not get underwater. In this way, submerging the wind turbine 132 while the pair of blades 133 extends along the horizontal direction makes it possible to prevent the blades 133 from being submerged.

As described above, according to the above embodiments, when the wind turbine 2 (82, 132) is submerged, the second electrical device 20 connected to the first electrical device 60 disposed at a high altitude via the cable 25 is movable in the vertical direction relative to the tower 8 (88). Thus, it is possible to securely prevent the second electrical device 20 from being submerged. Further, the second electrical device 20 is configured to be movable in the vertical direction relative to the tower 8 (88), which makes it possible to locate the second electrical device 20 at an appropriate position during normal operation of the wind turbine 2 (82, 132).

Embodiments of the present invention were described in detail above, but the present invention is not limited thereto, and various amendments and modifications may be implemented within a scope that does not depart from the present invention.

While the submergence unit for the wind turbine in the above embodiments feeds ballast water into the interior space of the tower or the ballast chamber of the floating body, the configuration of the submergence unit is not limited to this. For instance, the wind turbine may be submerged by adjusting tension of each of the plurality of mooring lines connected to the floating body. Further, the floating body may be submerged by applying weights or the weight of the ship or the like to the wind turbine or to the floating body.

REFERENCE SIGNS LIST 1, 81, 131 Floating-body type wind turbine power generating apparatus
2, 82, 132 Wind turbine generator
3, 83, 133 Blade
4, 84, 134 Hub
4a Hub cover
5 Rotor
6, 86, 136 Nacelle
8, 88 Tower
8a, 8b Water supply-and-drainage opening
10, 90 Floating body
11 Main floating body
12 Balance weight
13 Buoyance member
14 Footing
15 Anchor
16, 96 Mooring line
19 Cable roller
20 Electrical device box
21 Second electrical device
22, 99, 106, 11, 126 Float
23, 32 Clamp
25 Cable
26 Frame
27 Guide roller
41 Ladder cover
42 Ladder
45 Chain ring
47 Yaw rotation mechanism
60 First electrical device
61 Rotation shaft
62 Bearing
63 Drivetrain
91 First column
92 Second column
93 Third column
94 First lower hull
95 Second lower hull
96 Protection cover
100 Ship
101, 102, 103 Pump
102, 104 Hose
108 Crane
109 Lifting mechanism 115 Air chamber
120 Floating-body installation base
A First unloading position
B Second unloading position

The invention claimed is:

1. A method of transporting components of a floating-body type wind turbine power generating apparatus which comprises a floating body floating on a water surface and a wind turbine including: at least one blade; a hub to which the blade is mounted; a tower erected on the floating body; a nacelle disposed on the tower; a first electrical device disposed inside the hub or the nacelle; and a second electrical device connected to the first electrical device via a cable, the method comprising:
   a submergence step of submerging at least a part of the wind turbine together with the floating body; and
   a component-movement step of moving a component of the wind turbine between a first unloading position of at least one of the at least one blade, the hub or the nacelle, and a second unloading position in a vicinity of the water surface, after the submergence step,
   wherein, in the submergence step, the second electrical device is moved relative to the tower in a vertical direction inside the tower so that the second electrical device is not submerged upon submergence of the wind turbine and the floating body.

2. The method of transporting components of a floating-body type wind turbine power generating apparatus according to claim 1,
   wherein, in the component-movement step, a crane ship is used to move the component between the first unloading position and the second unloading position, and
   wherein the component is at least one of the at least one blade, or a drivetrain or a generator housed in the nacelle.

3. The method of transporting components of a floating-body type wind turbine power generating apparatus according to claim 1,
   wherein the at least one blade comprises a pair of blades extending in opposite directions from the hub,
   wherein the method further comprises an angular-position adjustment step of adjusting an angular position of the hub so that the pair of blades extends along a horizontal direction, before the submergence step, and
   wherein, in the submergence step, the wind turbine is submerged to a position where the pair of blades extending along the horizontal direction is not submerged.

4. The method of transporting components of a floating-body type wind turbine power generating apparatus according to claim 1,
   wherein, in the submergence step, a protection cover is attached to one of the at least one blade which is below the hub.

5. The method of transporting components of a floating-body type wind turbine power generating apparatus according to claim 1,
   wherein the method further comprises:
   a surfacing step of surfacing the wind turbine after the component-movement step; and
   a drying step of drying the wind turbine after the surfacing step.

6. The method of transporting components of a floating-body type wind turbine power generating apparatus according to claim 5,
   wherein the floating-body type wind turbine power generating apparatus is an offshore wind turbine disposed on ocean,
   wherein, in the submergence step, seawater is introduced into the wind turbine to submerge at least a part of the wind turbine, and
   wherein the method further comprises a cleaning step of cleaning the wind turbine with fresh water, after the surfacing step and before the drying step.

7. The method of transporting components of a floating-body type wind turbine power generating apparatus according to claim 1,
   wherein the method further comprises:
   a mooring-disconnection step of removing a mooring line which has an anchor for mooring the floating body from the floating body and attaching the mooring line to a buoy before the submergence step, and
   wherein, in the submergence step, the wind turbine is submerged while the mooring line is detached from the floating body.

* * * * *